(12) United States Patent
Takechi et al.

(10) Patent No.: US 9,629,349 B2
(45) Date of Patent: Apr. 25, 2017

(54) DUAL-BEARING REEL

(71) Applicant: Shimano Inc., Sakai, Osaka (JP)

(72) Inventors: Kunio Takechi, Osaka (JP); Hiroki Ogose, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/847,690

(22) Filed: Sep. 8, 2015

(65) Prior Publication Data

US 2016/0174537 A1   Jun. 23, 2016

(30) Foreign Application Priority Data

Dec. 19, 2014 (JP) ................................. 2014-257430

(51) Int. Cl.
*A01K 89/01* (2006.01)
*A01K 89/015* (2006.01)

(52) U.S. Cl.
CPC ........ *A01K 89/0193* (2015.05); *A01K 89/015* (2013.01); *A01K 89/01931* (2015.05)

(58) Field of Classification Search
CPC .............. A01K 89/015; A01K 89/0193; A01K 89/01931
See application file for complete search history.

(56) References Cited

U.S. PATENT DOCUMENTS

| 4,651,949 | A | * | 3/1987 | Sato ..................... | A01K 89/033 |
| | | | | | 192/14 |
| 5,020,738 | A | * | 6/1991 | Yamaguchi .......... | A01K 89/015 |
| | | | | | 242/247 |
| 5,443,219 | A | * | 8/1995 | Hashimoto .......... | A01K 89/015 |
| | | | | | 188/82.3 |
| 5,454,526 | A | * | 10/1995 | Kaneko ................ | A01K 89/015 |
| | | | | | 192/48.91 |
| 6,209,816 | B1 | * | 4/2001 | Hitomi .................. | A01K 89/01 |
| | | | | | 242/310 |
| 6,216,969 | B1 | * | 4/2001 | Yamaguchi ........ | A01K 89/0117 |
| | | | | | 242/247 |
| 2002/0023978 | A1 | * | 2/2002 | Ikuta .................. | A01K 89/0117 |
| | | | | | 242/247 |
| 2009/0277984 | A1 | * | 11/2009 | Wee ..................... | A01K 89/015 |
| | | | | | 242/257 |
| 2009/0314871 | A1 | * | 12/2009 | Kobayashi ........... | A01K 89/015 |
| | | | | | 242/255 |
| 2011/0011968 | A1 | * | 1/2011 | Ikuta .................... | A01K 89/015 |
| | | | | | 242/307 |

(Continued)

FOREIGN PATENT DOCUMENTS

JP    4-71466 U    6/1992

*Primary Examiner* — Emmanuel M Marcelo
(74) *Attorney, Agent, or Firm* — Global IP Counselors, LLP

(57) ABSTRACT

The present dual-bearing reel includes a first reel body, a second reel body, a first bearing member, a second bearing member, a spool, a spool shaft and a first urging member. The first bearing member is attached to the first reel body. The second bearing member is attached to the second reel body. The spool shall has a first protruding part. The first protruding part radially protrudes between the first bearing member and the second bearing member. The spool shaft is supported by the first and second bearing members. The urging member urges the first protruding part and the first bearing member in opposite directions.

12 Claims, 6 Drawing Sheets

(56) References Cited

U.S. PATENT DOCUMENTS

2011/0309177 A1* 12/2011 Hirayama ............ A01K 89/015
                                                      242/255
2013/0161433 A1*  6/2013 Takechi  ............... A01K 89/033
                                                      242/243

* cited by examiner

DUAL-BEARING REEL

CROSS-REFERENCE TO RELATED APPLICATIONS

This application claims priority to Japanese Patent Application No. 2014-257430 filed on Dec. 19, 2014, the entirety of which is hereby incorporated by reference in its entirety.

BACKGROUND

Field of the Invention

The present invention relates to a dual-bearing reel.

Background Information

A dual-bearing reel includes a reel unit and a spool rotatably supported by the reel unit. The spool is supported by the reel unit through a spool shaft. The spool shaft is supported by the reel unit through bearing members.

In the dual-bearing reel as described above, when the spool is rotated at a high speed in casting, chances are that rotational sound is produced in the bearing members. To prevent production of rotational sound, a dual-bearing reel described in Japan Utility Model Application Publication No. H04-71466 has a construction that inner and outer races in each beating member are displaced in a thrust direction by an urging means. With the construction, the inner and outer races make contact with rolling elements without any gap, and production of rotational sound can be thereby prevented.

However, the aforementioned dual-bearing reel has drawbacks such as the necessity to form a new space for installing an urging means.

SUMMARY

It is an object of the present invention to provide a dual-bearing reel in which an urging means or member can be installed without forming a surplus space.

A dual-bearing reel according to an aspect of the present invention includes a first reel body, a second reel body, a first bearing member, a second bearing member, a spool, a spool shaft and a first urging member. The first bearing member is attached to the first reel body. The second bearing member is attached to the second reel body. The spool is disposed between the first reel body and the second reel body. The spool shaft has a first protruding part. The first protruding part radially protrudes between the first bearing member and the second bearing member. The spool shaft is also supported by the first and second bearing members. The first urging member is disposed between the first protruding part and the first bearing member and urges the first protruding part and the first bearing member in opposite directions.

In the aforementioned dual-bearing reel, the first urging member urges the first bearing member. Hence, production of rotational sound can be prevented when the first bearing member is rotated. Furthermore, the first urging member is disposed between the first bearing member and the first protruding part. Hence, a new space is not required to be produced for installing the first urging member.

Preferably, the first bearing member includes an inner race, an outer race and a plurality of rolling elements. Furthermore, the first urging member preferably urges the inner race of the first bearing member. According to the construction, the inner race of the first bearing member is urged. Thus, the inner race and the outer race are axially displaced, and can make contact with the rolling elements without any gap.

Preferably, the spool shaft has a second protruding part radially protruding between the second bearing member and the first protruding part. Furthermore, the second protruding part preferably makes contact with the second bearing member.

Preferably, the dual-bearing reel further includes a second urging member. The second urging member urges the second bearing member toward the second protruding part.

Preferably, the second bearing member includes an inner race, an outer race and a plurality of rolling elements. Additionally, the second protruding part preferably makes contact with the inner race of the second bearing member. Furthermore, the second urging member preferably urges the outer race of the second bearing member.

Preferably, the dual-bearing reel thither includes a cylindrical member that is attached to an outer peripheral side of the spool shaft. Additionally, the spool shaft preferably has a third protruding part. The third protruding part radially protrudes on an axially outer side of the first bearing member. Furthermore, the cylindrical member is preferably disposed between the first bearing member and the third protruding part.

According to the construction, in opening the second reel body, the spool shaft can be inhibited from sticking out from the second reel body side due to the urging force of the first urging member. In other words, the cylindrical member is herein disposed between the third protruding part and the first beating member, and thus, the spool shaft is only allowed to move until the both ends of the cylindrical member make contact with the first bearing member and the third protruding part. Consequently, the sticking-out amount of the spool shaft can be reduced.

Overall, according to the present invention, urging means or member can be installed in a dual-bearing reel without forming a surplus space.

BRIEF DESCRIPTION OF THE DRAWINGS

Referring now to the attached drawings which form a part of this original disclosure.

DETAILED DESCRIPTION OF EMBODIMENTS

Figure 1:
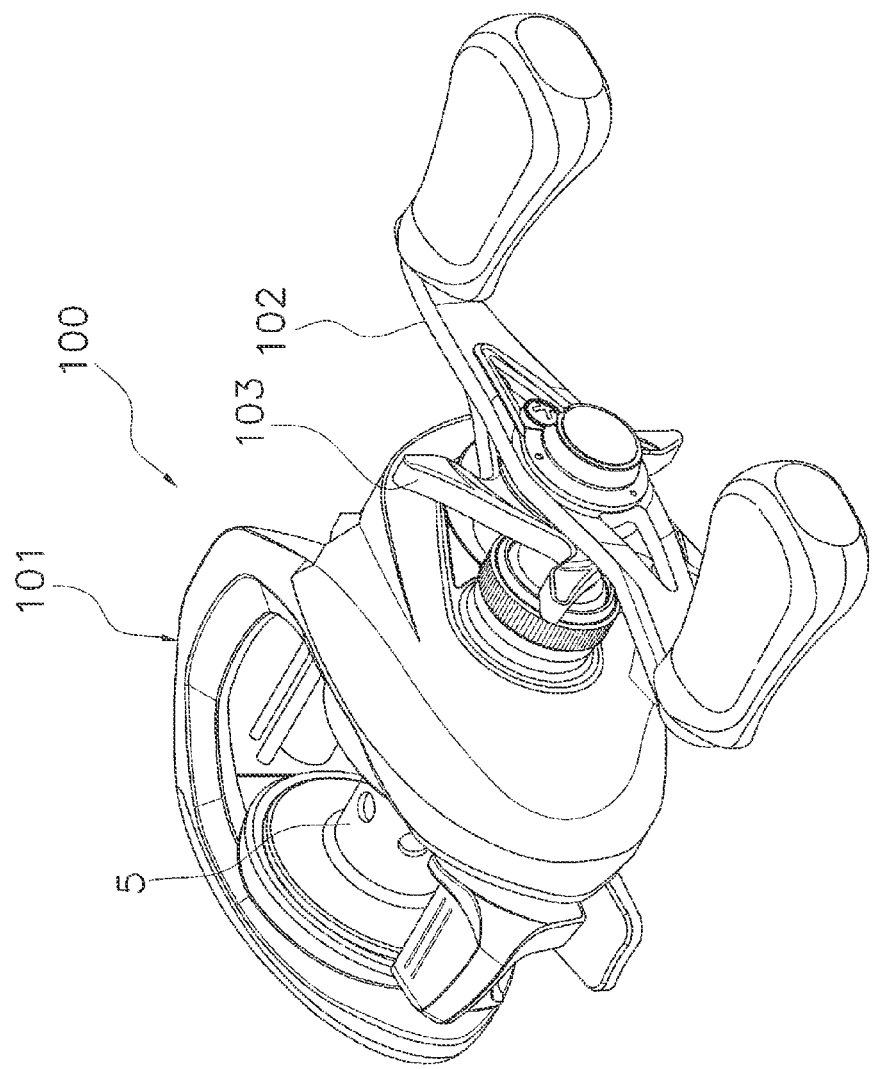
FIG. 1 is a perspective view of a dual-bearing reel.

A dual-bearing reel according to a preferred embodiment of the present invention will be hereinafter explained with reference to the attached drawings. FIG. 1 is a perspective view of the dual-beating reel, whereas FIG. 2 is a side view of the dual-bearing reel.

Figure 2:
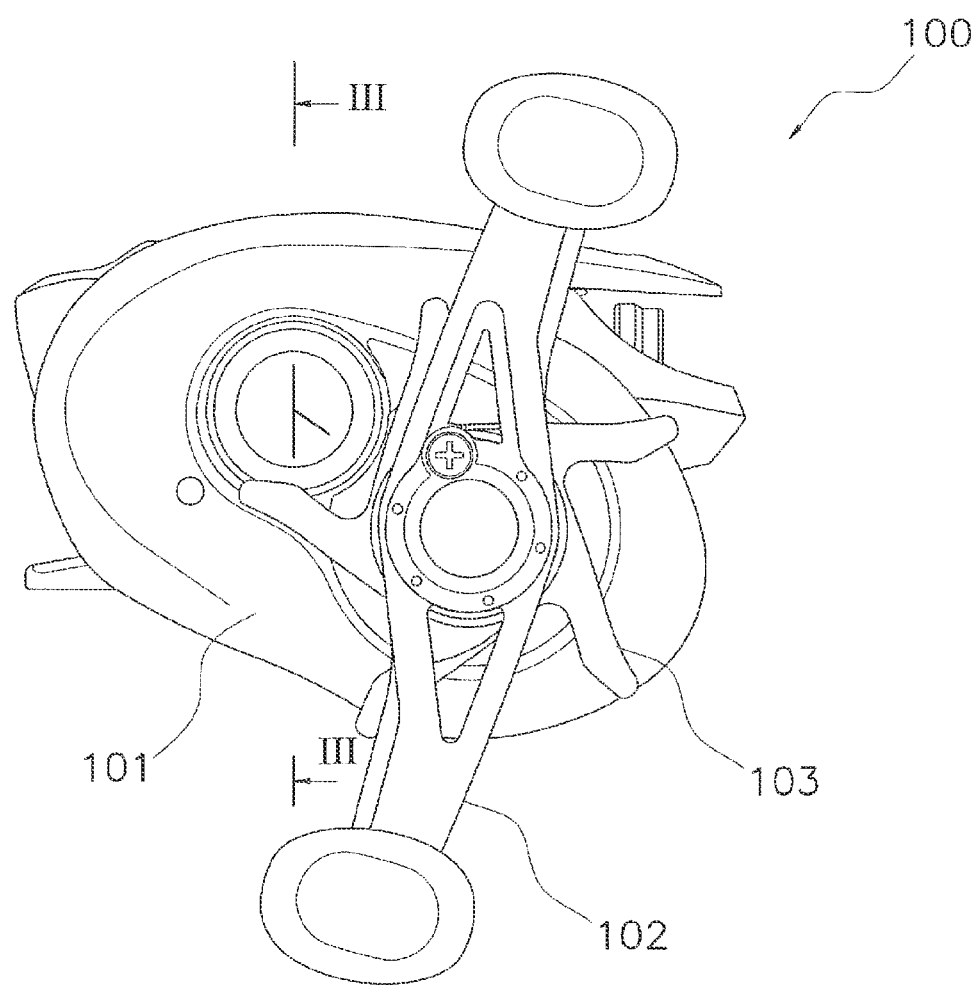
FIG. 2 is a side view of the dual-bearing reel.

As shown in FIGS. 1 and 2, a dual-bearing reel 100 includes a reel unit 101, a handle 102 and a star drag 103. The handle 102 and the star drag 103 are rotatably mounted to a lateral surface of the reel unit 101. When described in detail, the handle 102 and the star drag 103 are rotatably attached to a lateral surface of a first reel body 1 to be described.

Figure 3:
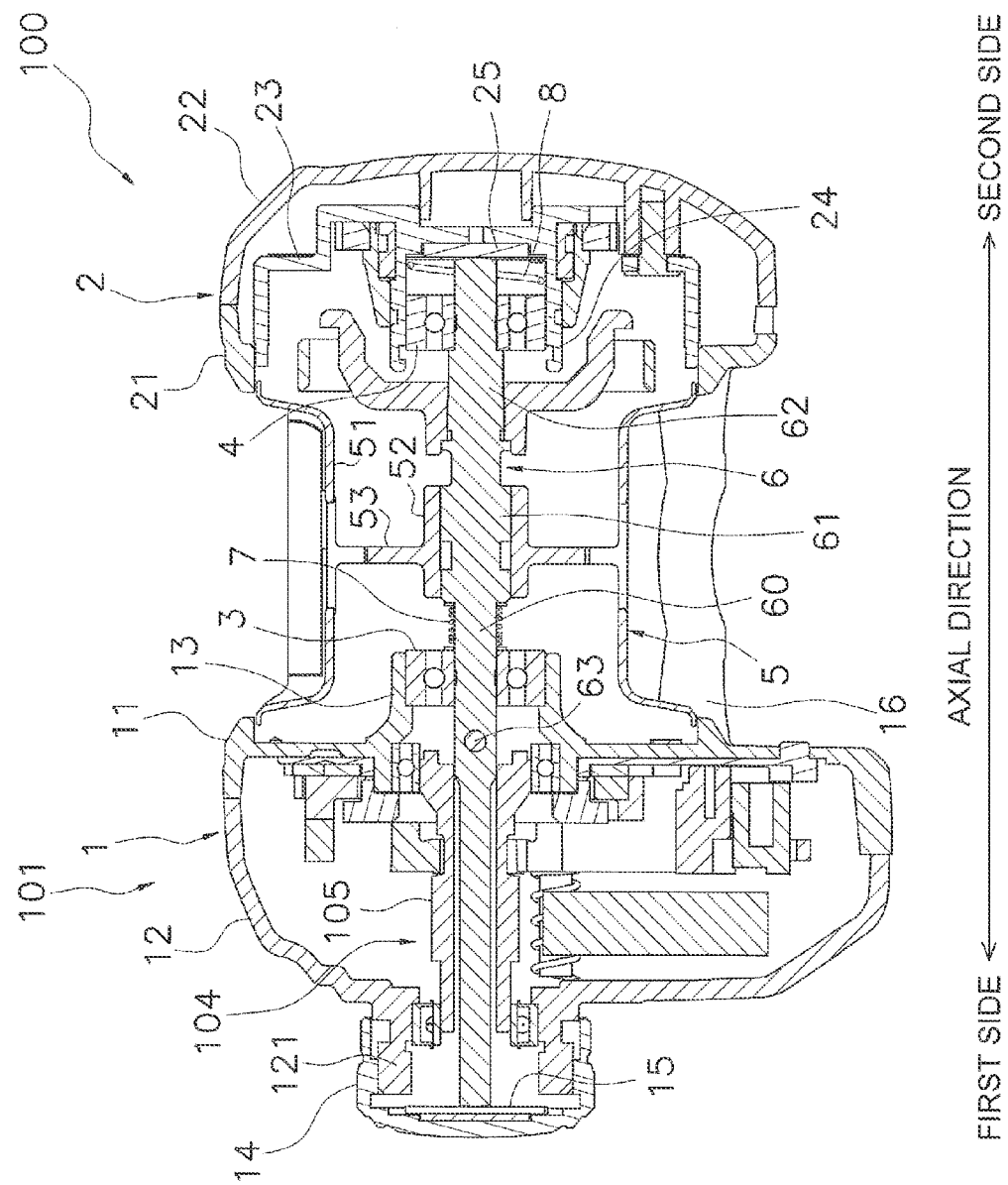
FIG. 3 is a cross-sectional view of FIG. 2 taken along line III-III.

FIG. 3 is a cross-sectional view of FIG. 2 taken along line III-III. It should be noted that in the following explanation, an axial direction indicates an extending direction of a spool shaft. Specifically, the axial direction is a right-and-left direction in FIG. 3. A radial direction indicates a radial direction of a circle centered at the spool shaft. Furthermore, a circumferential direction indicates a circumferential direction of the circle centered at the spool shaft.

As shown in FIG. 3, the dual-bearing reel 100 includes the first reel body 1, a second reel body 2, a first bearing member 3, a second bearing member 4; a spool 5, a spool shaft 6, a first urging member 7 and a second urging member 8. It should be noted that the first reel body 1 and the second reel body 2 are part of constituent components of the reel unit 101.

The first reel body 1 has a first side plate 11 and a first cover 12. The first reel body 1 has an accommodation space in the interior thereof. The accommodation space is defined by the first side plate 111 and the first cover 12.

The accommodation space accommodates a rotation transmission mechanism 104. The rotation transmission mechanism 104 is a mechanism configured to transmit rotation of the handle 102 to the spool 5. The rotation transmission mechanism 104 includes a drive shaft (not shown in the drawings), a drive gear (not shown in the drawings) and a pinion gear 105. The drive shaft is configured to be unitarily rotated with the handle 102. The drive gear is configured to be unitarily rotated with the drive shaft. The pinion gear 105 is meshed with the drive gear.

The first reel body 1 has a first holding part 13 for holding the first bearing member 3. It should be noted that the first holding part 13 is formed on the first side plate 11. The first holding part 13 has a roughly cylindrical shape and extends toward the second reel body 2. It should be also noted that the first holding part 13 is disposed so as to enclose an opening bored in the first side plate 11.

Figure 4:
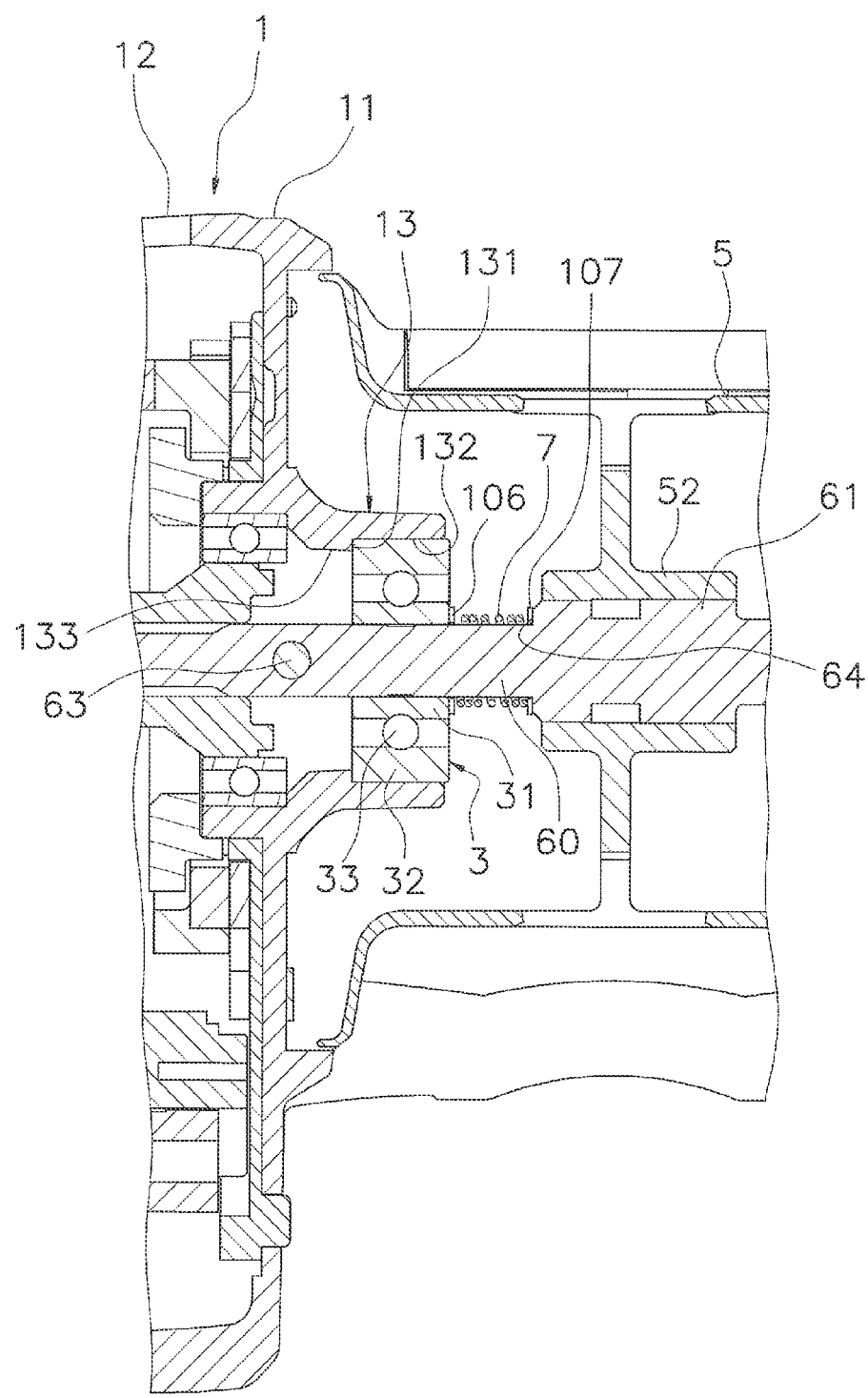
FIG. 4 is an enlarged view of FIG. 3.

FIG. 4 is an enlarged view of FIG. 3 focusing on the first bearing member 3 and its periphery. As shown in FIG. 4, the first holding part 13 has a first step 131 on the inner peripheral surface thereof. The first step 131 circumferentially extends along the inner peripheral surface of the first holding part 13. When described in detail, the first holding part 13 has a large diameter section 132 and a small diameter section 133 on the inner peripheral surface thereof. The inner diameter of the large diameter section 132 of the first holding part 13 is larger than that of the small diameter section 133 of the first holding part 13. The first step 131 is formed by the large diameter section 132 and the small diameter section 133.

As shown in FIG. 3, the second reel body 2 has a second side plate 21 and a second cover 22. The second side plate 21 is joined to the first side plate 11 through a joint part 16. The first side plate 11, the second side plate 21 and the joint part 16 are integrally formed and compose a frame of the reel unit 101. For example, the first side plate 11, the second side plate 21 and the joint part 16 are integrally molded by die casting of aluminum alloy.

The second reel body 2 has a fixation portion 23. The fixation portion 23 is attached to at least either of the second side plate 21 and the second cover 22.

The second reel body 2 has a second holding part 24 for holding the second bearing member 4. When described in detail, the second holding part 24 is formed on the fixation portion 23. The second holding part 24 has a roughly cylindrical shape and extends toward the first reel body 1.

As shown in FIG. 4, the first bearing member 3 includes an inner race 31, an outer race 32 and a plurality of rolling elements 33. The first bearing member 3 is attached to the first reel body 1. When described in detail, the first bearing member 3 is held by the first holding part 13. When described in more detail, the first bearing member 3 is held by the large diameter section 132 of the first holding part 13.

The outer diameter of the first bearing member 3 is roughly equal to the inner diameter of the first holding part 13. Thus, the first bearing member 3 is restricted from moving in the radial direction. Additionally; the first bearing member 3 makes contact with the first step 131, and is thereby restricted from moving toward the first reel body 1. When described in detail, the outer race 32 of the first bearing member 3 makes contact with the first step 131.

Figure 5:
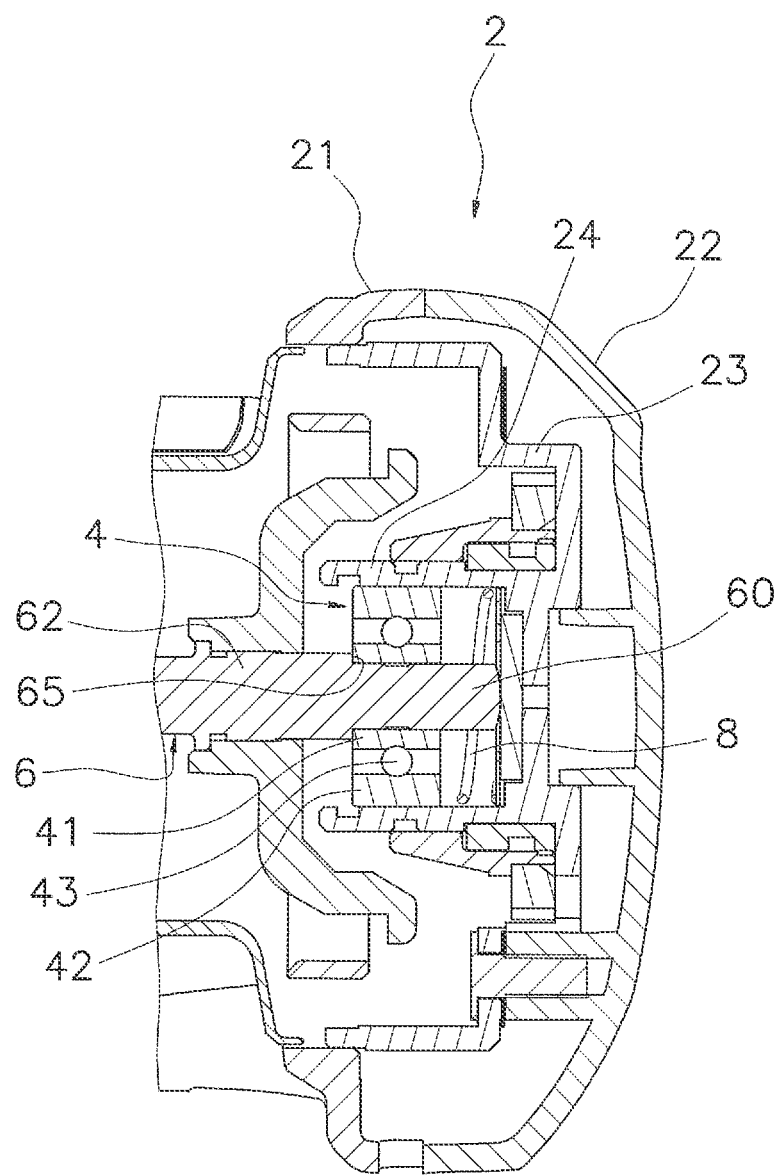
FIG. 5 is an enlarged view of FIG. 3.

FIG. 5 is an enlarged view of FIG. 3 focusing on the second bearing member 4. As shown in FIG. 5, the second bearing member 4 includes an inner race 41, an outer race 42 and a plurality of rolling elements 43. The second bearing member 4 is attached to the second reel body 2. When described in detail, the second bearing member 4 is held by the second holding part 24. The outer diameter of the second bearing member 4 is roughly equal to the inner diameter of the second holding part 24.

As shown in FIG. 3, the spool 5 is disposed between the first reel body 1 and the second reel body 2. The spool 5 has a roughly cylindrical shape and extends in the axial direction. The spool 5 includes a spool body 51 and a boss 52. The spool body 51 has a roughly cylindrical shape, and a fishing line is configured to be wound onto the outer peripheral surface of the spool body 51.

The boss 52 is disposed on the inner peripheral side of the spool body 51. The boss 52 has a cylindrical shape and extends in the axial direction. The boss 52 is joined to the spool body 51 through a joint part 53. It should be noted that the joint part 53 extends in the radial direction and is joined to the inner peripheral surface of the spool body 51 and the outer peripheral surface of the boss 52.

The spool shaft 6 is supported by the first bearing member 3 and the second bearing member 4. In other words, the spool shaft 6 is rotatably supported by the first reel body 1 through the first bearing member 3. Furthermore, the spool shaft 6 is rotatably supported by the second reel body 2 through the second bearing member 4.

The spool shaft 6 has a shaft body 60, a first protruding part 61 and a second protruding part 62. It should be noted that the shaft body 60, the first protruding part 61 and the second protruding part 62 are formed as a single member. The spool shaft 6 is supported at the shaft body 60 by the first and second bearing members 3 and 4.

The shaft body 60 has a columnar shape and extends from the first reel body 1 to the second reel body 2. When described in detail, a first end surface of the shaft body 60 makes contact with the first reel body 1, whereas a second end surface of the shaft body 60 makes contact with the second reel body 2.

When described in more detail, the first reel body 1 includes a brake cap 14. The brake cap 14 is screwed onto a threaded part 121 that is cylindrically formed on the first cover 12. The brake cap 14 accommodates a first friction plate 15 in the interior thereof. The first end surface of the shaft body 60 makes contact with the first friction plate 15.

The second reel body 2 includes a second fiction plate 25. The second friction plate 25 is disposed on the bottom of the second holding part 24. The second end surface of the shaft body 60 makes contact with the second friction plate 25.

The first protruding part 61 is disposed between the first bearing member 3 and the second bearing member 4. As shown in FIG. 4, the first protruding part 61 protrudes in the radial direction. Put differently; the first protruding part 61 has a diameter larger than that of the shaft body 60, and protrudes from the shaft body 60 in the radial direction. A second step 64 is formed by the first protruding part 61 and the shaft body 60.

The first protruding part 61 has a columnar shape. The spool 5 is attached to the first protruding part 61. When described in detail, the boss 52 is attached to the first protruding part 61. For example, the first protruding part 61 and the boss 52 are spline-coupled.

As shown in FIG. 3, the second protruding part 62 is disposed between the second bearing member 4 and the first protruding part 61. As shown in FIG. 5, the second protruding part 62 protrudes in the radial direction. In other words, the second protruding part 62 has a diameter larger than that of the shaft body 60, and protrudes from the shaft body 60 in the radial direction. A third step 65 is formed by the second protruding part 62 and the shaft body 60.

The second protruding part 62 has a columnar shape. The second protruding part 62 makes contact with the second bearing member 4. When described in detail, the second protruding part 62 makes contact with the inner race 41 of the second bearing member 4. It should be noted that the third step 65 makes contact with the inner race 41 of the second bearing member 4.

As shown in FIG. 3, the spool shaft 6 further includes a clutch pin 63. The clutch pin 63 penetrates the shaft body 60 in the radial direction. In other words, the clutch pin 63 radially protrudes from the spool shaft 6. The clutch pin 63 is disposed axially between the first bearing member 3 and the pinion gear 105. In other words, the clutch pin 63 is disposed on the axially outer side of the first bearing member 3. It should be noted that the clutch pin 63 is an exemplary third protruding part of the present invention.

The pinion gear 105 and the clutch pin 63 are configured to be engaged or disengaged in conjunction with axial movement of the pinion gear 105. When described in detail, the pinion gear 105 is urged by a coil spring (not shown in the drawings) so as to be engaged with the clutch pin 63. The pinion gear 105 and the clutch pin 63 are configured to be disengaged when the pinion gear 105 is moved oppositely to the clutch pin 63. When the pinion gear 105 and the clutch pin 63 are thus disengaged, rotation from the handle 102 is not transmitted to the spool shaft 6.

As shown in FIG. 4, the first urging member 7 urges the first protruding part 61 and the first bearing member 3 in opposite directions. The first urging member 7 urges the inner race 31 of the first bearing member 3. For example, the first urging member 7 is a compression coil spring. The first urging member 7 is disposed between the first protruding part 61 and the first bearing member 3. The first urging member 7 axially urges the first protruding part 61 and the first bearing member 3. The shaft body 60 extends through the interior of the first urging member 7.

The first urging member 7 urges the first bearing member 3 toward the first reel body 1 through a first washer 106. In other words, the first urging member 7 urges the first bearing member 3 to the left side in FIG. 4. The first urging member 7 urges the first protruding part 61 toward the second reel body 2 through a second washer 107. When described in detail, the first urging member 7 is supported by the second step 64.

The inner diameter of the first urging member 7 is larger than the outer diameter of the shaft body 60, and is smaller than the outer diameter of the first protruding part 61. Additionally, the inner diameter of the first urging member 7 is smaller than the outer diameter of the inner race 31 of the first bearing member 3.

As described above, the first urging member 7 urges the inner race 31 of the first bearing niember 3 toward the first reel body 1, and the outer race 32 of the first bearing member 3 is supported on the first reel body 1 side. With the construction, the inner race 31 and the respective rolling elements 33 make contact with each other without any gap. Additionally, the outer race 32 and the respective rolling elements 33 also make contact with each other without any gap. As a result, production of rotational sound from the first bearing member 3 can be inhibited.

As shown in FIG. 5, the second urging member 8 urges the second bearing member 4 toward the second protruding part 62. Specifically, the second urging member 8 urges the second bearing member 4 to the left side in FIG. 5. When described in detail, the second urging member 8 urges the outer race 42 of the second bearing member 4.

The second urging member 8 is, for instance, a compression coil spring. The second urging member 8 is disposed between the second bearing member 4 and the bottom surface of the second holding part 24. The second bearing member 4 is disposed between the second protruding part 62 and the second urging member 8.

As described above, the second urging member 8 urges the outer race 42 of the second bearing member 4 toward the second protruding part 62, whereas the inner race 41 of the second bearing member 4 is supported by the second protruding part 62. With the construction, the inner race 41 and the respective rolling elements 43 make contact with each other without any gap. Additionally, the outer race 42 and the respective rolling elements 43 also make contact with each other without any gap. As a result, production of rotational sound from the second bearing member 4 can be inhibited.

In the dual-bearing reel 100 according to the aforementioned preferred embodiment, the first urging member 7 is disposed between the first bearing member 3 and the first protruding part 61. Hence, a space is not required to be formed anew for installing the first urging member 7.

Modifications

One preferred embodiment of the present invention has been explained above. However, the present invention is not limited to the preferred embodiment, and a variety of changes can be herein made without departing from the scope of the present invention.

Modification 1

In the aforementioned preferred embodiment, the first step 131 continuously extends in the circumferential direction. Alternatively, the first step 131 may be intermittently formed in the circumferential direction.

Modification 2

Figure 6:
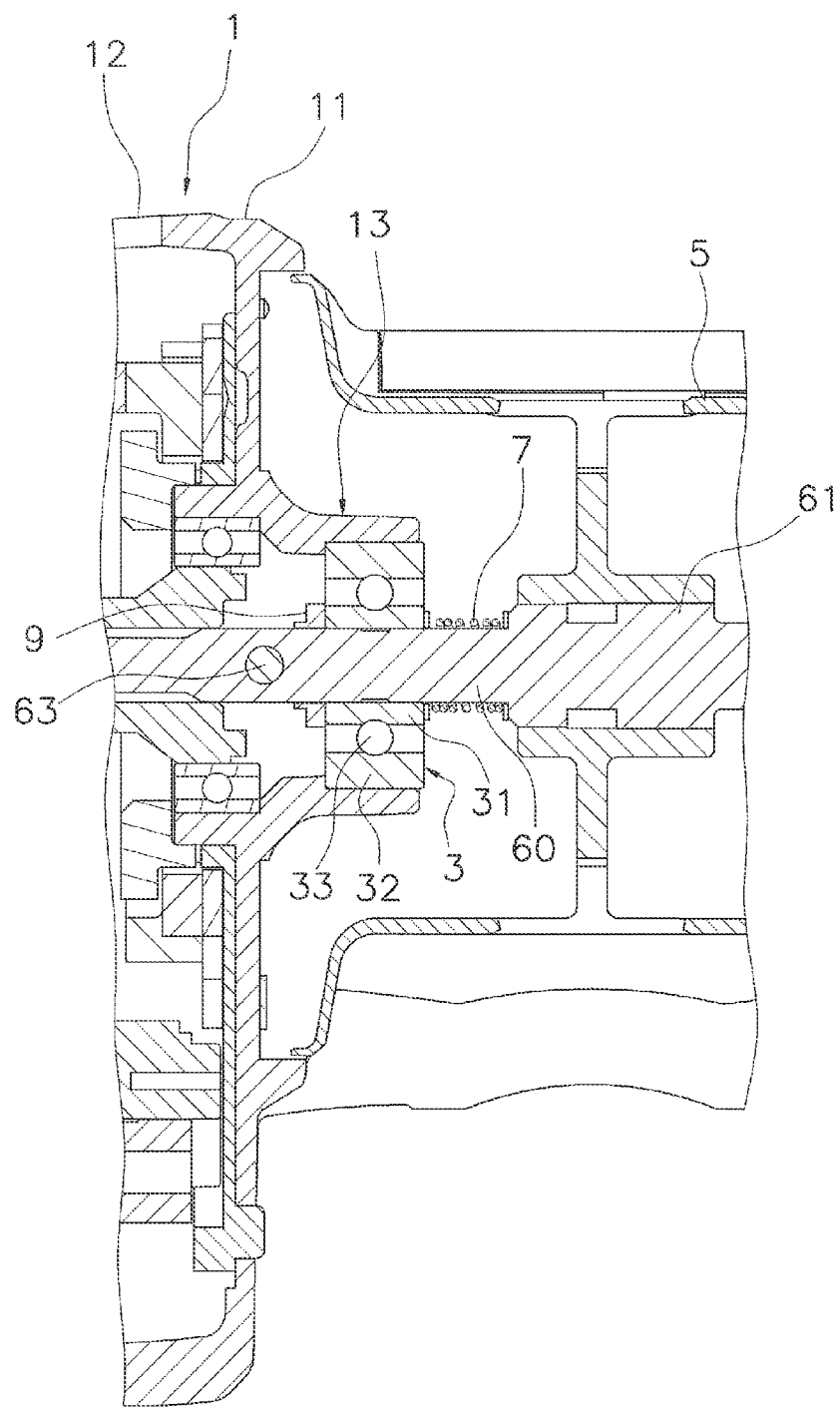
FIG. 6 is an enlarged cross-sectional view of a dual-bearing reel according to a modification.

As shown in FIG. 6, a cylindrical member 9 may be disposed between the clutch pin 63 and the first bearing member 3. The cylindrical member 9 is disposed on the outer peripheral side of the spool shaft 6. The inner diameter of the cylindrical member 9 is set so as to prevent the clutch pin 63 from passing through the cylindrical member 9.

What is claimed is:

1. A dual-bearing reel, comprising:
a first reel body;
a second reel body;
a first bearing member attached to the first reel body;
a second bearing member attached to the second reel body;
a spool disposed between the first reel body and the second reel body;
a spool shaft including a first protruding part and being supported by the first and second bearing members, the first protruding part radially protruding between the first bearing member and the second bearing member; and a first urging member disposed between the first protruding part and the first bearing member and urging the first protruding part and the first bearing member in opposite directions.

2. The dual-bearing reel according to claim 1, wherein the first bearing member includes an inner race, an outer race and a plurality of rolling elements, and the first urging member urges the inner race of the first bearing member.

3. The dual-bearing reel according to claim 2, wherein the spool shaft includes a second protruding part radially protruding between the second bearing member and the first protruding part, and the second protruding part contacts the second bearing member.

4. The dual-bearing reel according to claim 2, further comprising:

a cylindrical member attached to an outer peripheral side of the spool shaft, the spool shaft including a third protruding part radially protruding on an axially outer side of the first bearing member, and the cylindrical member being disposed between the first bearing member and the third protruding part.

5. The dual-bearing reel according to claim 1, wherein the first protruding part is integrally formed with the spool shaft.

6. A dual-bearing reel comprising:

a first reel body;

a second reel body;

a first bearing member attached to the first reel body;

a second bearing member attached to the second reel body;

a spool disposed between the first reel body and the second reel body;

a spool shaft including a first protruding part and being supported by the first and second bearing members, the first protruding part radially protruding between the first bearing member and the second bearing member; and a first urging member disposed between the first protruding part and the first bearing member and urging the first protruding part and the first bearing member in opposite directions, the spool shaft including a second protruding part radially protruding between the second bearing member and the first protruding part, and the second protruding part contacting the second bearing member.

7. The dual-bearing reel according to claim 6, further comprising:

a second urging member urging the second bearing member toward the second protruding part.

8. The dual-bearing reel according to claim 7, wherein the second bearing member includes an inner race, an outer race and a plurality of rolling elements, the second protruding part contacts the inner race of the second bearing member, and the second urging member urges the outer race of the second bearing member.

9. The dual-bearing reel according to claim 8, further comprising:

a cylindrical member attached to an outer peripheral side of the spool shaft, the spool shaft including a third protruding part radially protruding on an axially outer side of the first bearing member, and the cylindrical member being disposed between the first bearing member and the third protruding part.

10. The dual-bearing reel according to claim 7, further comprising:

a cylindrical member attached to an outer peripheral side of the spool shaft, the spool shaft including a third protruding part radially protruding on an axially outer side of the first bearing member, and the cylindrical member being disposed between the first bearing member and the third protruding part.

11. The dual-bearing reel according to claim 6, further comprising:

a cylindrical member attached to an outer peripheral side of the spool shaft, the spool shaft including a third protruding part radially protruding on an axially outer side of the first bearing member, and the cylindrical member being disposed between the first bearing member and the third protruding part.

12. A dual-bearing reel comprising:

a first reel body;

a second reel body;

a first bearing member attached to the first reel body;

a second bearing member attached to the second reel body;

a spool disposed between the first reel body and the second reel body;

a spool shaft including a first protruding part and being supported by the first and second bearing members, the first protruding part radially protruding between the first bearing member and the second bearing member;

a first urging member disposed between the first protruding part and the first bearing member and urging the first protruding part and the first bearing member in opposite directions; and a cylindrical member attached to an outer peripheral side of the spool shaft, the spool shaft including a third protruding part radially protruding on an axially outer side of the first bearing member, and the cylindrical member being disposed between the first bearing member and the third protruding part.

* * * * *